April 11, 1967
E. GRANBERG
3,313,184
CHAIN SAW SHARPENING MEANS
Filed Aug. 20, 1964
3 Sheets-Sheet 3
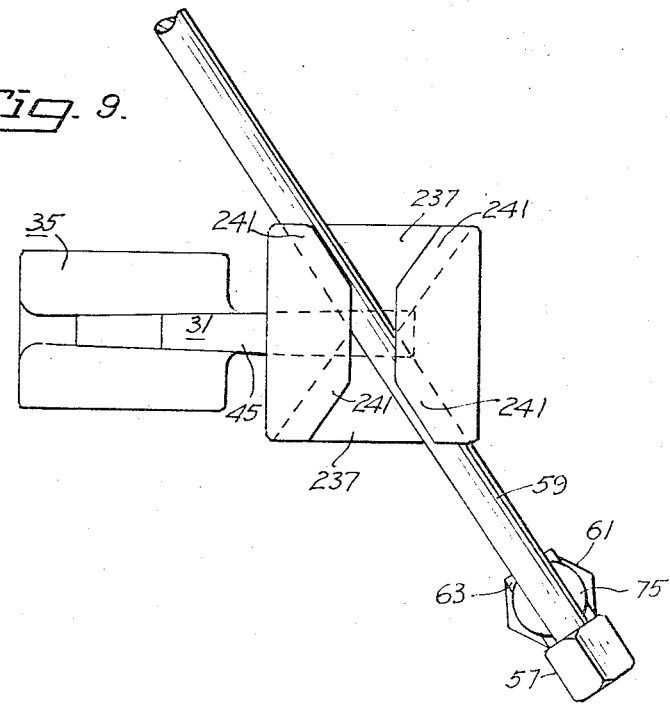
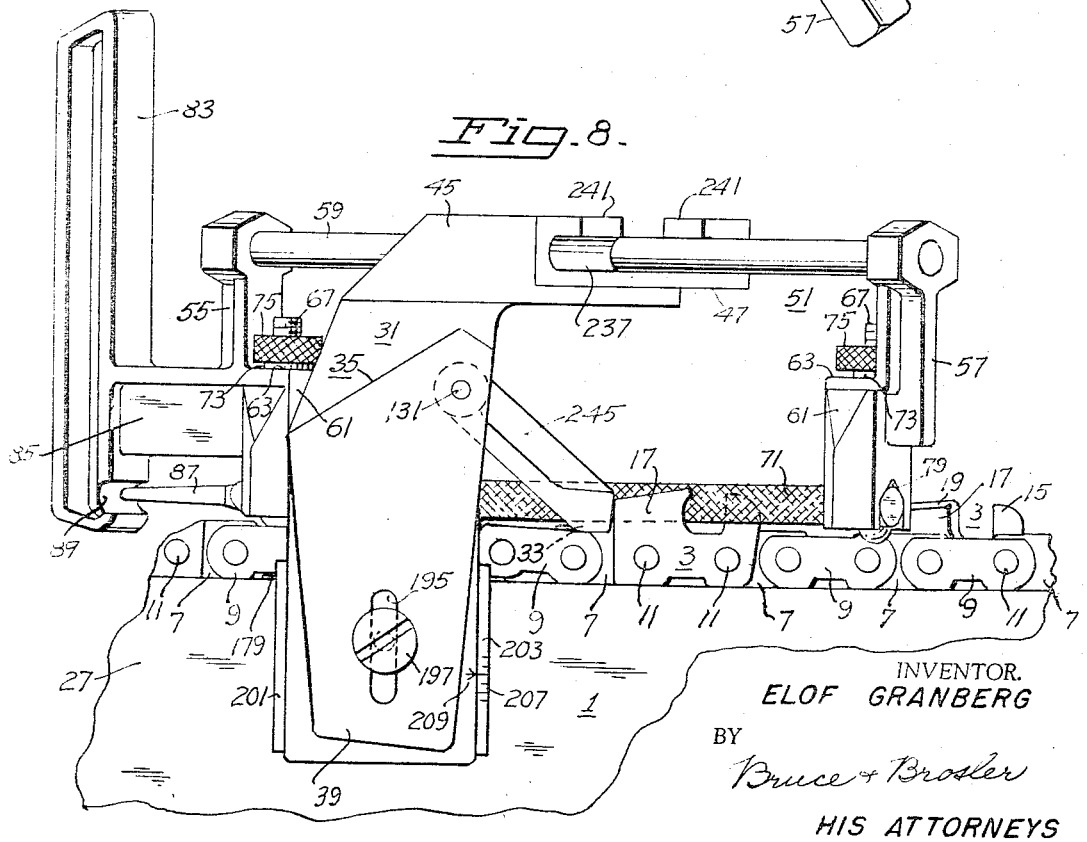
INVENTOR.
ELOF GRANBERG
BY
Bruce & Brosler
HIS ATTORNEYS United States Patent Office 3,313,184
Patented Apr. 11, 1967

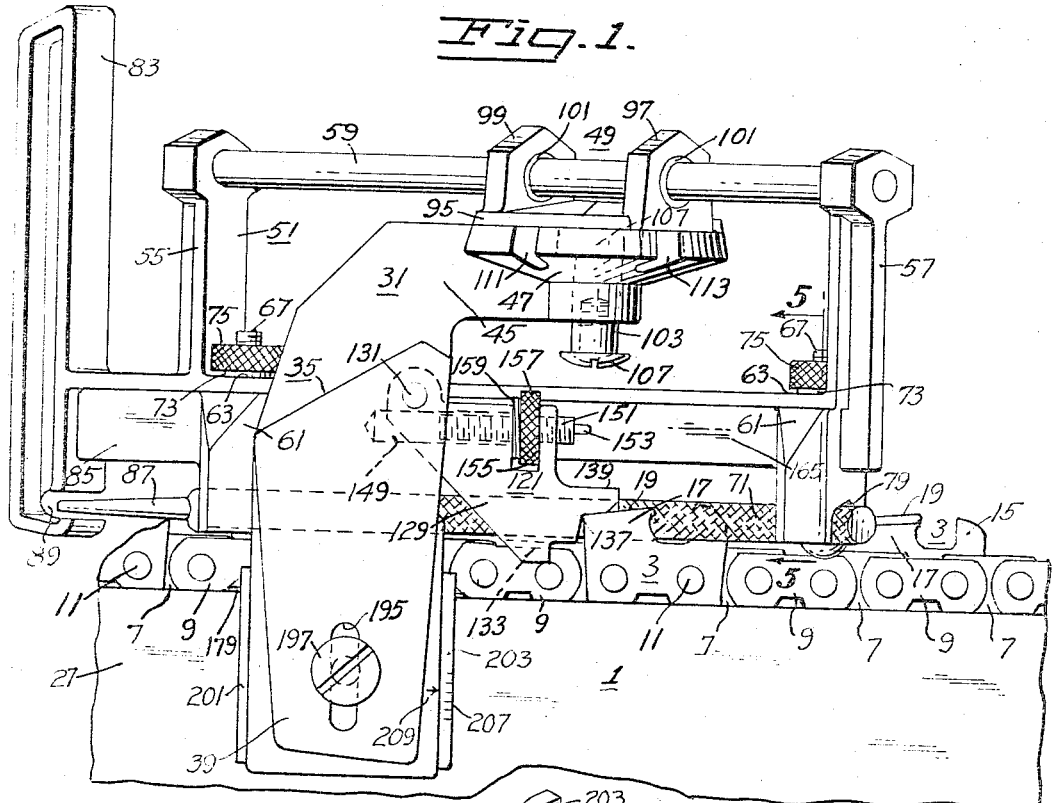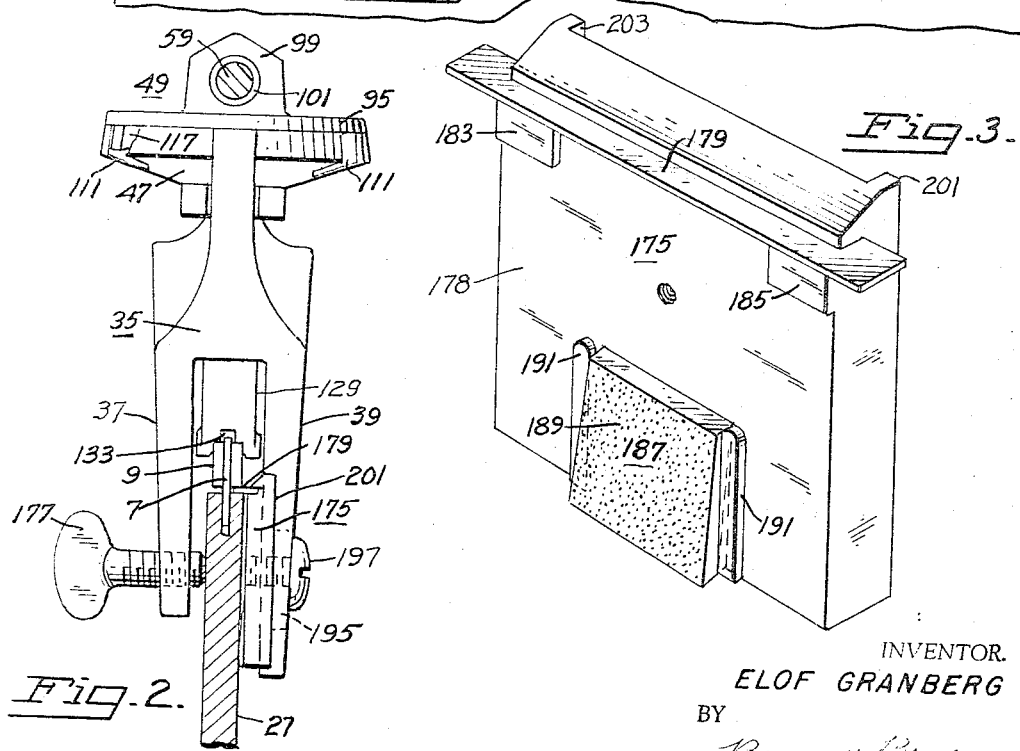

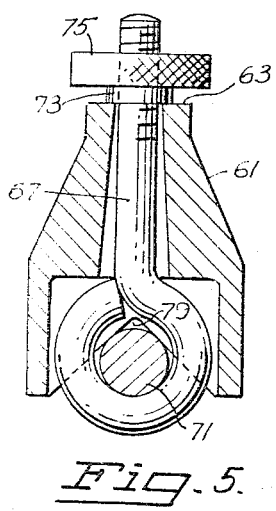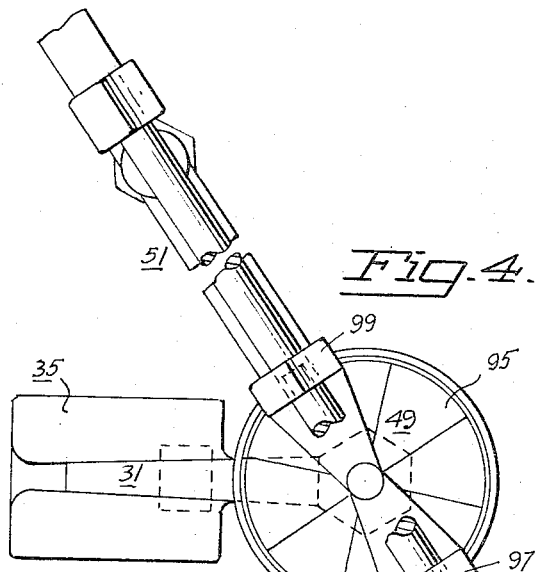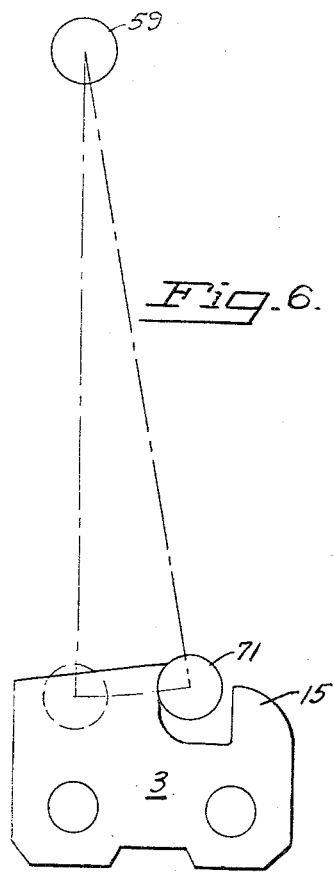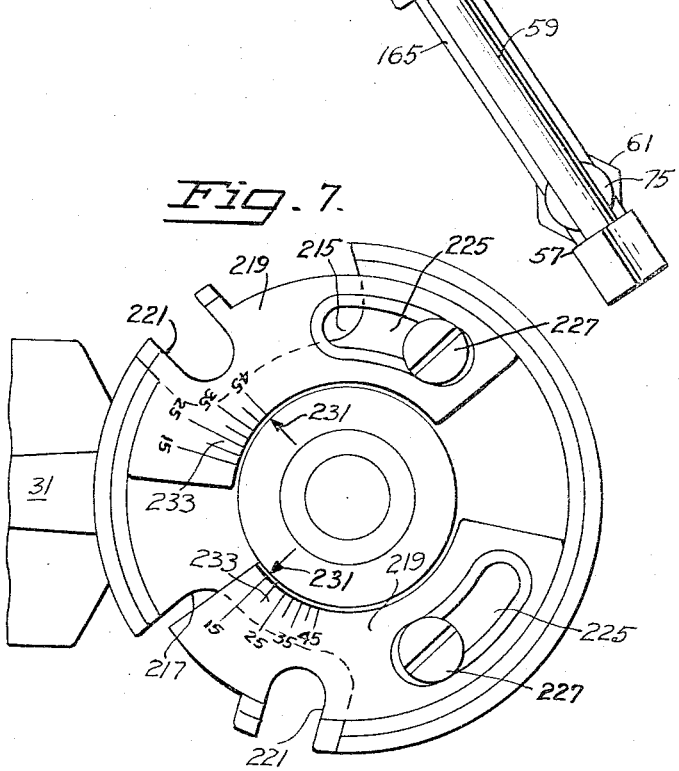

3,313,184
CHAIN SAW SHARPENING MEANS
Elof Granberg, 2659 Mira Vista Drive,
Richmond, Calif. 94805
Filed Aug. 20, 1964, Ser. No. 390,970
14 Claims. (Cl. 76—31)

My invention relates to apparatus for the sharpening of saws and more particularly to the sharpening of chain saws.

Chain saws generally involve a channeled saw bar along which the saw chain is driven to effect a cutting action.

The saw chains to which the present invention relates are the type employed in chain saws, and have structural characteristics which vary in different makes of chain saws. For most efficient cutting, these characteristics as originally built into the saw chains by their manufacturers, should be maintained as closely as practical when servicing the saw.

To maintain such characteristics accurately requires apparatus, normally complex, because of the complex relationships involved between the structural details of a saw chain, and the necessity for providing numerous adjustments in the servicing equipment to accommodate the equipment to chain saws of different makes.

Among the objects of my invention are:

(1) To provide a novel and improved apparatus for servicing chain saws;

(2) To provide a novel and improved apparatus for servicing chain saws of various types and makes, which apparatus shall be capable of approaching the ideal with a minimum requirement of component parts and adjustments.

Additional objects of my invention will be brought out in the following description of a preferred embodiment of the same, taken in conjunction with the accompanying drawings wherein:

FIGURE 1 is a side view in elevation of apparatus embodying the present invention in its preferred form;

FIGURE 2 is an end view in elevation of the apparatus of FIGURE 1;

FIGURE 3 is a three-dimensional view of a component part appearing in FIGURE 2 and embodying important features of the present invention;

FIGURE 4 is a top plan view of the apparatus of FIGURE 1;

FIGURE 5 is a view in section taken in the plane 5—5 of FIGURE 1;

FIGURE 6 is a diagrammatic view depicting a feature of the operation of the apparatus of FIGURE 1;

FIGURE 7 is a view corresponding to that of FIGURE 4 with the file frame assembly removed and depicting a modification for allowing a greater range of angle adjustment for such frame assembly;

FIGURE 8 is a side view in elevation depicting modifications in the apparatus of FIGURE 1, in the direction of simplification to provide an economical version of the invention;

FIGURE 9 is a plan view of the apparatus depicted in FIGURE 8.

Referring to the drawings for details of my invention, the invention is designed for the servicing of chain saws 1 wherein the cutter teeth 3 constitute elements of a saw chain. Such saw chain in general includes equally spaced drive links 7 coupled together on both sides by tie straps 9 except where the cutter teeth 3 are to be located, and at such locations, only one tie strap appears, the other side of the drive links being coupled by the cutter tooth 3. Rivets 11 hold these various components of the chain together, the rivets in most chains, being shoulder rivets, against the shoulders of which the drive links and the tie straps are held by the rivet heads.

The cutter teeth are the elements to be serviced when filing a saw chain. Each such cutter tooth involves a depth gauge 15 followed by a vertical section 17 topped by an arcuate flange 19, the advanced edges of which section and flange are sharpened on an angle of the order of 35 to 45 degrees to provide cutting edges. The arcuate flange portion is sloped rearwardly at a rake angle of approximately 7 degrees to provide clearance.

The saw chain is slidably mounted around the rim of a saw bar 27 with the drive links riding in the channel provided in the rim of the bar, and driven by a motor (not shown) to which the saw bar is mounted at one end thereof. The dimensions and angles involved in the cutter teeth of the saw chain may vary with chains of different makes, and it is essential from the viewpoint of maximum efficiency and long life, that characteristics originally designed into the cutter teeth, be maintained within practical limits.

The apparatus of the present invention, which is designed to accomplish this with a minimum of component parts and adjustments, involves a cast mounting bracket 31 in the form of a yoke 35 including substantially parallel legs 37, 39 spaced sufficiently to permit the same to clear the saw chain and straddle the saw bar. These legs at their upper ends merge into a lateral bracket arm 45, which at its extremity, terminates in a platform 47 on which to mount a file frame assembly including a slide rod guide 49 for the file frame 51.

Such file frame includes a pair of end frame members 55, 57, connected at their upper ends by a slide rod 59, with each end frame member formed with an inwardly directed offset 61 to present a shoulder 63.

A hole formed through each such offset is adapted to receive the upwardly directed threaded stem of an eye bolt 67, the eye of the bolt being of sufficient diameter to permit passage of a round file 71, while the threaded stem of the bolt is of sufficient length to protrude above the proximate shoulder 63 to receive a washer 73 and a tightening nut 75.

With a file supported by and between the two eye bolts, it can be drawn up tight against the lower ends of the end frame members, and by providing notches 79, and more particularly V-notches in the lower ends of such frame members, the file will be properly centered and securely gripped for filing.

A frame handle 83 may be cast integrally with one of the end frame members, being joined to the end frame member by a connecting bar 85 at a point above the file, to provide a protective cover for the tail 87 of the file and thus safeguard the user against probable injury. To permit of relatively close spacing between the handle and the proximate end frame member, the handle may be cast with a recess 89 to receive the free end of the tail and at the same time, afford additional protection.

The file frame is adapted to be slidably supported on the platform 47, by the slide rod guide 49 which is adapted to slidably receive the slide rod of the frame to permit guided reciprocation of the file frame in predetermined angular relationship to the normal to the plane of the yoke, which angular relationships are necessary inasmuch as the file must approach the cutter tooth at a predetermined angular relationship, to effect sharpening, the specific angle being determined by the cutting edges of the tooth as originally set by the manufacturer. In about 75% of the cases, the angle will be 35 degrees, while in about 15%, the angle will be 45 degrees. In about 10%, the angles may deviate from these two angles. In some instances, a change of angle from 35 degrees to 45 degrees may be desirable as a cutter tooth is filed back, to avoid a tendency of some cutter teeth to bind as the cutting portion becomes shorter.

The ability, therefore, to file at either a 35 degree angle or a 45 degree angle, will obviously take care of substantially 90% of all chain saws, and this is provided for in the embodiment of FIGURE 1, wherein provision is made for adjusting the frame to either one of such two angles to one side of such plane, and to corresponding angles to the other side of such plane, to provide for corresponding sharpening of both left and right hand cutter teeth.

Toward this end, the adjustable slide rod guide of the embodiment of FIGURE 1 may take the form of a disc 95 corresponding in diameter to that of the platform 47, which disc will carry a pair of aligned ears 97, 99 each provided with a bearing 101 through which the slide rod may pass and be slidably supported.

A fixed stem 103 extending downwardly from the center of the disc through the platform along the axis thereof, carries at its lower end in slightly spaced relationship to the underside of the platform, a stop 107, preferably in the form of a machine screw threaded into the lower exposed end of the stem. The stem may have a portion 107 of enlarged diameter adjacent the disc 95, to be received in a matching recess in the platform to provide increased stability to the assembly.

When so mounted, the file frame is capable of being reciprocated for filing purposes; it may be swung on the axis of the slide rod; it may be rotated on the axis of the stem through 360° so as to alter the angle of the frame with respect to the plane of the yoke; and in addition to all this, the stop 107 permits of limited lifting of the file frame assembly off the supporting platform whereby to conveniently lift the file away from a chain being serviced and free the frame for rotation on the stem axis.

Its operational position is preferably limited to either of the two angles of 35 and 45 degrees, to the left and right of the plane of the yoke, and for such purpose, I provide to one side of such plane, a notch 111 in one quadrant of the platform, at an angle of 35° to the normal to such plane, and a similar notch 113 in the other quadrant at an angle of 45° to the normal to such plane, and corresponding notches are provided in such platform to the other side of the plane of the yoke.

To the lower side of the disc portion of the slide bar guide, is a depending lug 117 adapted to snugly fit any one of such notches, which permits the frame to be selectively adjusted to any one of these angles, the stop 107 at the lower end of the stem 103 being sufficiently spaced to permit such lug to clear the platform, when adjustments are being effected.

In sharpening the tooth of a chain saw, it becomes apparent that the material backing the cutting edge of the tooth becomes shorter and shorter. In view of the fact that the cutting portion of the tooth is formed with a rake angle of the order of 7°, the cutting path of the file into the tooth should follow very closely, such angle in order to maintain the proper cutting edge of the tooth. This is accomplished in the embodiment of FIGURE 1 of the present invention, by (1) providing a stop pawl assembly 121 against which the cutting tooth to be serviced is abutted, to position such tooth for filing, the length of the assembly being such as to position the rear edge of the tooth in substantial alignment with the axis of the pivot stem 103 of the slide bar guide, and (2) by making the end frame members of a length which will establish a radius of swing of the frame about the axis of the slide rod 59 such that the file in filing down a tooth, must follow an arc, which for all practical purposes closely matches the 7° rake angle of the tooth. The path of swing of the file into the tooth to realize this, therefore, is a function of the position of the tooth and the radius of swing of the file frame.

The specific stop pawl assembly of the present invention, includes a pawl 129 hingedly secured within the crotch of the yoke by a hinge pin 131, such pawl being provided with a groove 133 along the bottom thereof, adapting the pawl to drop over and straddle an adjacent link of the chain, to center the chain at a point in proximity to the tooth to be serviced, and thus discourage wobbling of such tooth while being filed.

At its forward end, the pawl is formed with an angular notch 137 adapted to approximately complement the upper rear corner of the cutter tooth and form a finger 139 resting along the upper side of such tooth. As a file is applied against the cutting edge of such tooth, a component of pressure against the pawl is developed, and such component of pressure tends to swing the pawl clockwise about its pivot or hinge axis, thereby causing the finger 139 to bear downwardly against the tooth being serviced.

Thus the tooth being filed, is not only stabilized against wobbling while being worked on, but is also automatically stabilized against vertical motion. With the tooth thus held, spurious movements thereof are avoided, with the result that filing will be expedited and accurate.

Only a limited amount of filing is required to effect sharpening of the cutting edge of a tooth, beyond which, unnecessary wearing down of the tooth results. To effect a limit to such sharpening operation, an adjustable stop is built into the stop pawl assembly, to place a limit on the extent to which filing may be carried on during a sharpening procedure.

In its preferred form, the stop pawl, in its front edge, is provided with a hole 149, preferably of square section, to slidably receive a screw shank 151 of similar cross section, in one end of which, is embedded a tip 153 of material such as nylon or the like. Intercepting the hole 149 is a notch 155 into which is positioned an adjusting nut 157 which is threaded onto the screw shank, as the screw shank is inserted into its hole in the pawl. When so assembled, rotation of the adjusting nut 157 will cause the screw shank to move in one direction or the other, depending on the direction of rotation of the adjusting nut, and thereby alter the position of the tip 153. A captive compression spring 159 between the adjusting nut 157 and the proximate wall of the notch 155 will function to maintain an adjustment against accidental change.

In line with such tip, is an intermediate bar 165 connecting the end frame members, such bar, in the embodiment under consideration, being preferably cast with the end frame members and the frame handle as an integral unit.

Thus, as the file frame swings downward with continued filing of a cutter tooth, it will ultimately abut the nylon tip to preclude further filing of such tooth. With such limit imposed, each cutter tooth will be sharpened to a common dimension, and consequently all cutter teeth will be uniform.

The mounting bracket yoke 35 includes means for effectively clamping the apparatus to a saw bar. Such means involves a clamp pad 175 affixed to the inner surface of one leg of the yoke for bearing against one side of the saw bar to which the apparatus is to be clamped, as by tightening of a thumb screw 177 passing through the opposing leg.

The clamp pad involves a plate 178, preferably of metal, on which is a guide strip 179 adjacent the upper edge thereof and adapted to rest on the upper edge of the saw bar when mounting the apparatus. The plate is preferably cast, with the guide strip embedded therein.

To assure stability in clamping the apparatus in position, engagement of the clamp pad against one side of the saw bar at three widely spaced locations or points is provided for, this being accomplished by slight protuberances 183, 185 integrally cast on the clamping pad at each upper corner thereof, just below the guide strip 179, and a lower protuberance 187 intermediate the side edges of the clamping pad, this latter protuberance being in the form of a strip 189 of emery paper or cloth to secure a good frictional grip against the saw bar during clamping.

Saw bars, however, as previously indicated, may be of two types, namely a flat bar which fills the area bounded by the saw chain, and a bow bar which may comprise but a rim of the order of 1¼ inches in width. To assure adequate clamping of the apparatus to either type, with the increased stability permitted by the flat bar, the area of application for the emery strip is inclined toward the bottom edge of the clamping pad, and preferably bounded on each side by a shallow rib 191. Such ribs are sufficiently shallow to permit the emery strip to be exposed above the surface plane of such ribs.

When clamped to a chain saw of the bow bar type, the emery strip will engage at some intermediate point on the emery strip, as for example where the inner edge of the bow bar strikes. However, when applied to a chain saw of the flat bar type, the lower end of the emery strip will engage the bar, due to the rising surface to which the strip is affixed, thereby effecting wider spacing between the upper contact points and the contact with the emery strip, thus increasing the stability of the apparatus when mounted on such saw.

The guide strip 179 when resting on the upper edge of a saw bar, will determine the elevational position of the file 71 with respect to the saw chain, or more specifically the cutter teeth 3 thereof, which are to be sharpened with such file. Accordingly, inasmuch as the dimensions of such cutter teeth may vary with saws of different makes, some slight range of adjustment of the guide strip would be in order, and this I accomplish by providing for elevational adjustment of the clamp pad 175 on the leg of the yoke to which it is affixed.

Toward this end, the leg in question is provided with a vertical slot 195 through which extends a screw 197 into the clamp plate 178, whereby the clamp pad may be shifted vertically and clamped in any adjustable position within the range permitted by the slot 195. To assure that the clamp pad cannot shift angularly about the axis of the clamping screw 197, and thus render the guide strip useless for its intended purpose, the plate 178 of the clamp pad is provided with vertical bounding ribs 201, 203 adapted to slidably engage the proximate edges of the leg to which the pad is affixed, whereby the clamp pad will be properly oriented at all times, regardless of the elevational adjustment being utilized.

An indication of such adjustment may be provided for by placing an elevational adjustment scale 207 along one of the ribs 203, and an arrow 209 on the outer surface of the supporting leg, adjacent to such scale.

Should one desire to convert the embodiment of FIGURE 1 to apparatus adapted to permit more precise angular adjustment of the file frame, to angles within a wide range of angular adjustments, as from 15° to 45° for example, the platform 47 may be modified by providing a wide notch 215 in one quarter, to one side of the plane of the yoke 35, and of sufficient arcuate extent as to embrace the range of adjustments with respect to the normal to such plane, and a corresponding notch 217 to the other side of said plane.

Associated with each such notch is an adjustable arcuate segment 219 having an edge notch 221 lying within the ends of the associated wide angle notch, and by arcuate adjustment of the segment strip, its edge notch may be located at any point within the confines of the wide angle notch.

An arcuate slot 225 through the arcuate segment at a suitable location, and a locking screw 227 passing therethrough into the platform proper, will permit of such adjustments and subsequent locking of the segment in any adjusted position. The angular positions represented by such adjustments may be indicated by an arrow 231 on the hub of the platform and an associated scale 233 on the proximate adjustable segment. The adjustment will be made prior to mounting the file frame assembly on the platform, to satisfy the requirements of the particular chain saw to be sharpened.

An economical version of the present invention is illustrated in the embodiment of FIGURES 8 and 9 of the drawings. In this embodiment, the slide rod guide and the platform are merged, the platform being formed with V-recesses 237 overlapping at their apexes, along the normal to the plane of the yoke and exposed from above, to provide slide guide surfaces for the slide rod 59 in either of two angular positions with respect to such normal. By forming such V-recesses to cover an angle of 70°, each operating position of the file frame will be at an angle of 35° with respect to such normal, and such, as indicated previously, will satisfy the requirements of approximately 75% of chain saws.

Flanges 241 in overhanging relationship to the guide surfaces of each V-notch, will function to hold the slide rod against tilting during filing and thus stabilize the file in its proper plane for filing.

In this economical version of the invention, the stop pawl assembly 121 of the embodiment of FIGURE 1, may be reduced to a single element 245 hinged in a similar manner in the crotch of the yoke 35 by a hinge pin 131, and provided with a groove 133 in the lower edge to permit the pawl to drop over and straddle the drive link adjacent the cutter tooth to be sharpened, with the cutter tooth abutting the pawl.

The elimination of the filing limit stop 153 from this embodiment, permits the elimination of the intermediate bar 165 from the file frame, thus enabling additional economy in the manufacture of the device, though the limit of filing must then be gauged visually.

From the foregoing, it becomes apparent that the invention illustrated and described is subject to alteration and modification without departing from the underlying principles involved and I, accordingly, do not desire to be limited in my protection to the specific details illustrated and described except as may be necessitated by the appended claims.

I claim:

1. Apparatus for sharpening of chain saws and the like comprising
   a mounting bracket including
   a mounting yoke having a pair of substantially parallel legs spaced to clear the chain of a chain saw and straddle the saw bar,
   a bracket arm extending laterally from said yoke and terminating in a platform on which to support a file frame assembly,
   a file frame assembly comprising a file frame and including means for slidably mounting the same on said platform,
   and means for clamping said yoke to a saw bar with said file frame properly oriented as to elevation with respect to a cutting tooth of such saw chain, said means including
   a clamp pad comprising a plate,
   means adjustably affixing said plate to the inner side of one of said legs,
   said plate having elevation determining guide means thereon adjacent the upper edge thereof and adapted to rest on the upper edge of a saw bar when mounting said apparatus thereon.

2. Apparatus for sharpening of chain saws and the like comprising
   a mounting bracket including
   a mounting yoke having a pair of substantially parallel legs spaced to clear the chain of a chain saw and straddle the saw bar,
   a bracket arm extending laterally from said yoke and terminating in a platform on which to support a file frame assembly,
   a file frame assembly comprising a file frame and including means for slidably mounting the same on said platform,
   and means for clamping said yoke to a saw bar with said file frame properly oriented as to elevation with respect to a cutting tooth of such saw chain, said means including a clamp pad comprising a plate, means adjustably affixing said plate to the inner side of one of said legs, said plate having a file frame elevation determining guide strip thereon adjacent the upper edge thereof and adapted to rest on the upper edge of a saw bar when mounting said apparatus thereon, and means carried by said other leg to enable gripping a saw bar between itself and said clamp pad.

3. Apparatus for sharpening of chain saws and the like comprising a mounting bracket including a mounting yoke having a pair of substantially parallel legs spaced to clear the chain of a chain saw and straddle the saw bar, a bracket arm extending laterally from said yoke and terminating in a platform on which to support a file frame assembly, a file frame assembly comprising a file frame and including means for slidably mounting the same on said platform, and means for clamping said yoke to a saw bar with said file frame properly oriented as to elevation with respect to a cutting tooth of such saw chain, said means including a clamp pad comprising a plate, means adjustably affixing said plate to the inner side of one of said legs, said means including said leg having a longitudinal slot, and a clamping screw through said slot into said plate, said plate having a file frame elevation determining guide strip thereon adjacent the upper edge thereof and adapted to rest on the upper edge of a saw bar when mounting said apparatus thereon, and a thumb screw threadedly extending through said other leg to enable gripping a saw bar between itself and said clamp pad, and means for stabilizing the gripping of such saw bar.

4. Apparatus for sharpening of chain saws and the like comprising a mounting bracket including a mounting yoke having a pair of substantially parallel legs spaced to clear the chain of a chain saw and straddle the saw bar, a bracket arm extending laterally from said yoke and terminating in a platform on which to support a file frame assembly, a file frame assembly comprising a file frame and including means for slidably mounting the same on said platform, and means for clamping said yoke to a saw bar with said file frame properly oriented as to elevation with respect to a cutting tooth of such saw chain, said means including a clamp pad comprising a plate, means adjustably affixing said plate to the inner side of one of said legs, said means including said leg having a longitudinal slot, and a clamping screw through said slot into said plate, said plate having a file frame elevation determining guide strip thereon adjacent the upper edge thereof and adapted to rest on the upper edge of a saw bar when mounting said apparatus thereon, and a thumb screw threadedly extending through said other leg to enable gripping a saw bar between itself and said clamp pad, and means for stabilizing the gripping of such saw bar, said means including a shallow boss at each upper corner of said plate and a shallow boss adjacent the lower edge of said plate intermediate the side edges thereof to provide a three point engagement with a saw bar.

5. Apparatus for sharpening of chain saws and the like comprising a mounting bracket including a mounting yoke having a pair of substantially parallel legs spaced to clear the chain of a chain saw and straddle the saw bar, a bracket arm extending laterally from said yoke and terminating in a platform on which to support a file frame assembly, a file frame assembly comprising a file frame and including means for slidably mounting the same on said platform, and means for clamping said yoke to a saw bar with said file frame properly oriented as to elevation with respect to a cutting tooth of such saw chain, said means including a clamp pad comprising a plate, means adjustably affixing said plate to the inner side of one of said legs, said means including said leg having a longitudinal slot, and a clamping screw through said slot into said plate, said plate having a file frame elevation determining guide strip thereon adjacent the upper edge thereof and adapted to rest on the upper edge of a saw bar when mounting said apparatus thereon, and a thumb screw threadedly extending through said other leg to enable gripping a saw bar between itself and said clamp pad, and means for stabilizing the gripping of such saw bar, said means including a shallow boss at each upper corner of said plate and a shallow boss adjacent the lower edge of said plate intermediate the side edges thereof to provide a three point engagement with a saw bar, said intermediate boss having a saw bar engageable surface sloping upwardly toward said lower edge and comprising a strip of friction material applied to a correspondingly sloping section of said plate.

6. Apparatus for sharpening chain saws and the like comprising a mounting bracket including a mounting yoke having a pair of substantially parallel legs spaced to clear the chain of a chain saw and straddle the saw bar, a bracket arm extending laterally from said yoke and terminating in a platform on which to support a file frame assembly, a file frame assembly comprising a file frame including a pair of end frame members, a slide rod connecting said end frame members at one end thereof, and means for clamping a file in the other end of said end frame members, a slide rod guide on said rod, and means for rotatably mounting said slide rod guide on said platform to permit of angular adjustment of said file frame about said rotatable mounting means, said rotatable mounting means including a stem depending from said slide rod guide, said stem slidably and rotatably extending through said platform, and a stop on said stem in spaced relationship to the underside of said platform to permit limited lifting of said slide rod guide from said platform, means for selectively guiding said file frame in predetermined angular positions with respect to the plane of said yoke, and means for clamping said yoke to a saw bar with said file frame properly oriented with respect to a cutting tooth of such saw chain.

7. Apparatus for sharpening chain saws and the like comprising a mounting bracket including a mounting yoke having a pair of substantially parallel legs spaced to clear the chain of a chain saw and straddle the saw bar, a bracket arm extending laterally from said yoke and terminating in a platform on which to support a file frame assembly, a file frame assembly comprising a file frame including a pair of end frame members, each terminating at one end in a V-notch, a cylindrical slide rod connecting said end frame members at their other ends, and means for clamping a file in said V-notches, a slide rod guide on said rod, and means for rotatably mounting said slide rod guide on said platform to permit of angular adjustment of said file frame about said rotatable mounting means with free hinge movement of said frame in said slide rod guide, said rotatable mounting means including a stem depending from said slide rod guide, said stem slidably and rotatably extending through said platform, and a stop on said stem in spaced relationship to the underside of said platform to permit limited lifting of said slide rod guide from said platform, means for selectively guiding said file frame in predetermined angular positions with respect to the plane of said yoke, said means including said platform having recesses therein located at selected angular distances to one side of said plane, and a like number of recesses correspondingly located to the other side of said plane, and a lug depending from said slide rod guide and adapted to fit into any of said recesses, the location of said recesses being such as to determine proper operating angular relationship of said file frame to the teeth of a saw chain, when said apparatus is mounted on a chain saw, and means for clamping said yoke to a saw bar with said file frame properly oriented with respect to a cutting tooth of such saw chain.

8. Apparatus for sharpening chain saws and the like comprising a mounting bracket including a mounting yoke having a pair of substantially parallel legs spaced to clear the chain of a chain saw and straddle the saw bar, a bracket arm extending laterally from said yoke and terminating in a platform on which to support a file frame assembly, a file frame assembly comprising a file frame including a pair of end frame members, each terminating at one end in a V-notch, a cylindrical slide rod connecting said end frame members at their other ends, and means for clamping a file in said V-notches, a slide rod guide on said rod, and means for rotatably mounting said slide rod guide on said platform to permit of angular adjustment of said file frame about said rotatable mounting means with free hinge movement of said frame in said slide rod guide, said rotatable mounting means including a stem depending from said slide rod guide, said stem slidably and rotatably extending through said platform, and a stop on said stem in spaced relationship to the underside of said platform to permit limited lifting of said slide rod guide from said platform, means for selectively guiding said file frame in predetermined angular positions with respect to the plane of said yoke, said means including said platform having recesses therein located at selected angular distances to one side of said plane, and a like number of recesses correspondingly located to the other side of said plane, and a lug depending from said slide rod guide and adapted to fit into any of said recesses, means for effectively adjusting the angular distances of said recesses with respect to said plane, the location of said recesses being such as to determine proper operating angular relationship of said file frame to the teeth of a saw chain, when said apparatus is mounted on a chain saw, means for locating the cutting edge of a tooth to be filed, sufficiently in advance of said rotatable mounting means as to cause a file carried by said file frame to file into such tooth along a path substantially paralleling the upper sloping surface of such tooth, and means for clamping said yoke to a saw bar with said file frame properly oriented with respect to a cutting tooth of such saw chain.

9. Apparatus for sharpening of chain saws and the like comprising a mounting bracket including a mounting yoke having a pair of substantially parallel legs spaced to clear the chain of a chain saw and straddle the saw bar, a bracket arm extending laterally from said yoke and terminating in a platform on which to support a file frame assembly, a file frame assembly comprising a file frame including a pair of end frame members, each terminating at one end in a notch, a slide rod connecting said end frame members at their other ends, and means for clamping a file in said notches, a slide rod guide on said rod, means for rotatably mounting said slide rod guide on said platform to permit of angular adjustment of said file frame about said rotatable mounting means, said rotatable mounting means including a stem depending from said slide rod guide, said stem slidably and rotatably extending through said platform, and a stop on said stem in spaced relationship to the underside of said platform to permit limited lifting of said slide rod guide from said platform, means for selectively restricting said file frame to certain predetermined angular positions with respect to the plane of said yoke, and means for clamping said yoke to a saw bar with said file frame properly oriented as to elevation with respect to a cutting tooth of such saw chain, said means including a clamp pad comprising a plate, means adjustably affixing said plate to the inner side of one of said legs, said means including said leg having a longitudinal slot, and a clamping bolt through said slot into said plate, said plate having an elevation determining guide strip cast therein adjacent the upper edge thereof and adapted to rest on the upper edge of a saw bar when mounting said apparatus thereon, and a thumb screw threadedly extending through said other leg to enable gripping a saw bar between itself and said clamp pad.

10. Apparatus for sharpening of chain saws and the like comprising a mounting bracket including a mounting yoke having a pair of substantially parallel legs spaced to clear the chain of a chain saw and straddle the saw bar, a bracket arm extending laterally from said yoke and terminating in a platform on which to support a file frame assembly, a file frame assembly comprising a file frame including a pair of end frame members, each terminating at one end in a V-notch, a slide rod connecting said end frame members at their other ends, and means for clamping a file in said V-notches, a slide rod guide on said rod, means for rotatably mounting said slide rod guide on said platform to permit of angular adjustment of said file frame about said rotatable mounting means, said rotatable mounting means including a stem depending from said slide rod guide, said stem slidably and rotatably extending through said platform, and a stop on said stem in spaced relationship to the underside of said platform to permit limited lifting of said slide rod guide from said platform, means for selectively restricting said file frame to certain predetermined angular positions with respect to the plane of said yoke, said means including said platform having recesses therein located at selected angular distances to one side of said plane, and a like number of recesses correspondingly located to the other side of said plane, and a lug depending from said slide rod guide and adapted to fit into any of said recesses, the location of said recesses being such as to determine proper operating angular relationship of said file frame assembly to the teeth of a saw chain, when said apparatus is mounted on a chain saw, means for clamping said yoke to a saw bar with said file frame properly oriented as to elevation with respect to a cutting tooth of such saw chain, said means including a clamp pad comprising a plate, means adjustably affixing said plate to the inner side of one of said legs, said means including said leg having a longitudinal slot, and a clamping screw through said slot into said plate, said plate having a file frame elevation determining guide strip cast therein adjacent the upper edge thereof and adapted to rest on the upper edge of a saw bar when mounting said apparatus thereon, and a thumb screw threadedly extending through said other leg to enable gripping a saw bar between itself and said clamp pad, and means for stabilizing the gripping of such saw bar.

11. Apparatus for sharpening chain saws and the like comprising a mounting bracket including a mounting yoke having a pair of substantially parallel legs spaced to clear the chain of a chain saw and straddle the saw bar, a bracket arm extending laterally from said yoke and terminating in a platform on which to support a file frame assembly, a file frame assembly comprising a file frame including a pair of end frame members, each terminating at one end in a V-notch, a slide rod connecting said end frame members at their other ends, and means for clamping a file in said V-notches, a slide rod guide on said rod, means for rotatably mounting said slide rod guide on said platform to permit of angular adjustment of said file frame about said rotatable mounting means, said rotatable mounting means including a stem depending from said slide rod guide, said stem slidably and rotatably extending through said platform, and a stop on said stem in spaced relationship to the underside of said platform to permit limited lifting of said slide rod guide from said platform, means for selectively restricting said file frame to certain predetermined angular positions with respect to the plane of said yoke, said means including said platform having recesses therein located at selected angular distances to one side of said plane, and a like number of recesses correspondingly located to the other side of said plane, and a lug depending from said slide rod guide and adapted to fit into any of said recesses, the location of said recesses being such as to determine proper operating angular relationship of said file frame to the teeth of a saw chain, when said apparatus is mounted on a chain saw, means for clamping said yoke to a saw bar with said file frame properly oriented as to elevation with respect to a cutting tooth of such saw chain, said means including a clamp pad comprising a plate, means adjustably affixing said plate to the inner side of one of said legs, said means including said leg having a longitudinal slot, and a clamping screw through said slot into said plate, said plate having a file frame elevation determining guide strip cast therein adjacent the upper edge thereof and adapted to rest on the upper edge of a saw bar when mounting said apparatus thereon, and a thumb screw threadedly extending through said other leg to enable gripping a saw bar between itself and said clamp pad, and means for stabilizing the gripping of such saw bar, said means including a shallow boss at each upper corner of said plate and a shallow boss adjacent the lower edge of said plate intermediate the side edges thereof to provide a three point engagement with a saw bar, said intermediate boss having a saw bar engageable surface sloping upwardly toward said lower edge and comprising a strip of friction material applied to a correspondingly sloping section of said plate.

12. Apparatus for sharpening chain saws and the like comprising a mounting bracket including a mounting yoke having a pair of substantially parallel legs spaced to clear the chain of a chain saw and straddle the saw bar, a bracket arm extending laterally from said yoke and terminating in a platform on which to support a file frame assembly, a file frame assembly comprising a file frame including a pair of end frame members, each terminating at one end in a V-notch, a slide rod connecting said end frame members at their other ends, and means for clamping a file in said V-notches, a slide rod guide on said rod, means for rotatably mounting said slide rod guide on said platform to permit of angular adjustment of said file frame about said rotatable mounting means, said rotatable mounting means including a stem depending from said slide rod guide, said stem slidably and rotatably extending through said platform, and a stop on said stem in spaced relationship to the underside of said platform to permit limited lifting of said slide rod guide from said platform, means for selectively restricting said file frame to certain predetermined angular positions with respect to the plane of said yoke, said means including said platform having recesses therein located at selected angular distances to one side of said plane, and a like number of recesses correspondingly located to the other side of said plane, and a lug depending from said slide rod guide and adapted to fit into any of said recesses, the location of said recesses being such as to determine proper operating angular relationship of said file frame to the teeth of a saw chain, when said apparatus is mounted on a chain saw, means for clamping said yoke to a saw bar with said file frame properly oriented as to elevation with respect to a cutting tooth of such saw chain, said means including a clamp pad comprising a plate, means adjustably affixing said plate to the inner side of one of said legs, said means including said leg having a longitudinal slot, and a clamping screw through said slot into said plate, said plate having a file frame elevation determining guide strip cast therein adjacent the upper edge thereof and adapted to rest on the upper edge of a saw bar when mounting said apparatus thereon, and a thumb screw threadedly extending through said other leg to enable gripping a saw bar between itself and said clamp pad, and means for stabilizing the gripping of such saw bar, said means including a shallow boss at each upper corner of said plate and a shallow boss adjacent the lower edge of said plate intermediate the side edges thereof to provide a three point engagement with a saw bar, said intermediate boss having a saw bar engageable surface sloping upwardly toward said lower edge and comprising a strip of friction material applied to a correspondingly sloping section of said plate.

13. Apparatus for sharpening chain saws and the like comprising a mounting bracket including a mounting yoke having a pair of substantially parallel legs spaced to clear the chain of a chain saw and straddle the saw bar, a bracket arm extending laterally from said yoke and terminating in a platform on which to support a file frame assembly, a file frame assembly comprising a file frame including a pair of end frame members, each terminating at one end in a notch, a slide rod connecting said end frame members at their other ends, and means for clamping a file in said notches, means for selectively guiding said file frame in predetermined angular positions with respect to the plane of said yoke, means for clamping said yoke to a saw bar with said file frame properly oriented with respect to a cutter tooth of such saw chain, and means for causing a file to file a path through a cutter tooth, running substantially parallel to the rake angle surface of such tooth, said means including a stop pawl assembly hingedly secured in the crotch of said yoke and provided with an adjustable stop means for limiting the arc of swing of said file frame, said pawl including a groove along the bottom thereof for straddling a link of saw chain and an angular notch at the forward end thereof for engaging the upper rear end of a cutter tooth.

14. The apparatus for sharpening chain saws of claim 8 wherein said means for locating the cutting edge of a tooth to be filed comprises a stop pawl assembly hingedly secured in the crotch of said yoke and provided with an adjustable stop means for limiting the arc of swing of said file frame, said pawl including a groove along the bottom thereof for straddling a link of saw chain and an angular notch at the forward end thereof for engaging the upper rear end of a cutter tooth.

References Cited by the Examiner

UNITED STATES PATENTS

| | | | |
|---|---|---|---|
| 1,923,445 | 8/1933 | Loibl | 76—31 |
| 2,818,752 | 1/1958 | Granberg | 76—31 |
| 2,932,993 | 4/1960 | Weatherly et al. | 76—25 |
| 3,227,007 | 1/1966 | Kincannon | 76—31 |

GRANVILLE Y. CUSTER, JR., *Primary Examiner.*